United States Patent [19]

Dreyer et al.

[11] Patent Number: 4,580,507
[45] Date of Patent: Apr. 8, 1986

[54] DRILL FOR APPLYING SEED AND FERTILIZER

[75] Inventors: Heinz Dreyer, Hasbergen; Benno Wiemeyer, Lotte-Halen, both of Fed. Rep. of Germany

[73] Assignee: Amazonen Werke H. Dreyer GmbH & Co KG, Hasbergen Gaste, Fed. Rep. of Germany

[21] Appl. No.: 489,899

[22] Filed: Apr. 29, 1983

[30] Foreign Application Priority Data

| May 3, 1982 [DE] | Fed. Rep. of Germany | 3216376 |
| Jun. 23, 1982 [DE] | Fed. Rep. of Germany | 3223378 |
| Jun. 23, 1982 [DE] | Fed. Rep. of Germany | 3223377 |
| Jun. 23, 1982 [DE] | Fed. Rep. of Germany | 3223376 |

[51] Int. Cl.⁴ .............................................. A01C 5/00
[52] U.S. Cl. .......................................... 111/73; 111/85
[58] Field of Search ............ 172/624.5, 705, 266-268, 172/484; 111/52, 73, 80, 85-87, 34

[56] References Cited

U.S. PATENT DOCUMENTS

| 258,153 | 5/1882 | Thompson | 111/73 |
| 594,699 | 11/1897 | Williams | 111/86 |
| 1,229,604 | 6/1917 | Garst | 111/80 |
| 1,284,589 | 11/1918 | Campbell | 111/86 |
| 2,159,652 | 5/1939 | Brunner | 111/73 |
| 2,239,918 | 4/1941 | Kriegbaum | 172/268 |
| 2,713,836 | 7/1955 | Ajero | 111/85 |
| 2,734,439 | 2/1956 | Padrick | 111/80 |
| 2,764,111 | 8/1956 | Collins | 111/86 X |
| 2,779,263 | 1/1957 | Franz et al. | 111/86 X |
| 2,924,189 | 2/1960 | McLeod | 111/80 |
| 3,177,830 | 4/1965 | Zimmerman | 111/86 |
| 3,251,325 | 5/1966 | Hyland et al. | 111/86 |
| 3,259,087 | 7/1966 | Horton | 111/7 |
| 3,517,752 | 6/1970 | Glee | 111/86 X |
| 4,132,181 | 1/1979 | Smith et al. | 111/7 |
| 4,201,142 | 5/1980 | Stump | 111/7 |
| 4,202,474 | 5/1980 | Dreyer | 111/80 X |
| 4,278,036 | 7/1981 | Buchele | 111/85 |
| 4,417,530 | 11/1983 | Kopecky | 111/73 |

FOREIGN PATENT DOCUMENTS

| 107929 | 7/1939 | Australia | 172/705 |
| 148485 | 4/1951 | Australia | 111/80 |
| 153245 | 4/1952 | Australia | 111/73 |
| 2552810 | 6/1977 | Fed. Rep. of Germany | 111/85 |
| 2640749 | 3/1978 | Fed. Rep. of Germany | 111/85 |
| 2016756 | 6/1978 | Fed. Rep. of Germany | 111/80 |
| 1166304 | 11/1958 | France | 172/484 |
| 754298 | 8/1956 | United Kingdom | 111/86 |
| 304901 | 7/1971 | U.S.S.R. | 111/80 |

Primary Examiner—James R. Feyrer
Attorney, Agent, or Firm—Sprung Horn Kramer & Woods

[57] ABSTRACT

A drill for applying seed and fertilizer, with a frame, reservoirs, sowing shares with at least two separate inlets for seed and fertilizer, and a depth-adjustment or pressure roller mounted behind each share, in which the materials to be applied are conveyed in controlled amounts to the shares for application into the soil, in which the shares are connected to the frame with parallelogrammatic mounts and the depth to which the penetrate into the soil can be adjusted by means of a setting device. The drill can be used for zero tillage even on rocky soil to apply seed and fertilizer separately because the sowing share is a chisel share on which a chisel is mounted on the side facing the direction of travel. The chisel share has separate guides for seed and fertilizer inside its body. The outlets for these guides are separated in the direction of travel by a certain distance with the first outlet positioned as close as possible behind the chisel point. The chisel point extends deeper into the soil than the two outlets.

12 Claims, 15 Drawing Figures

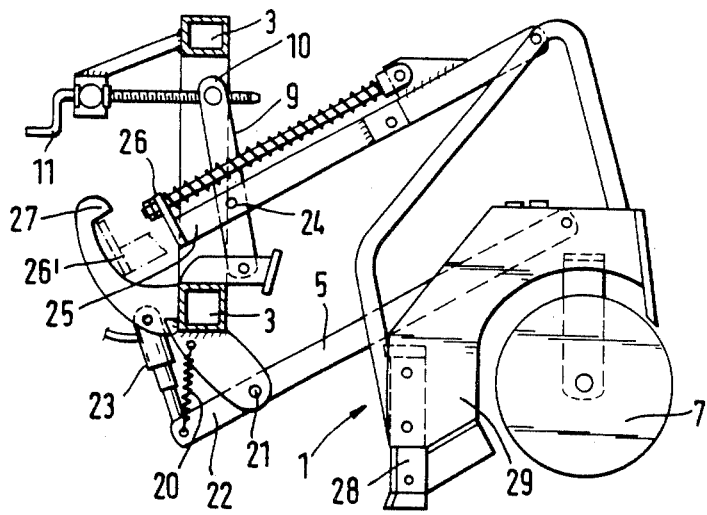
FIG. 3
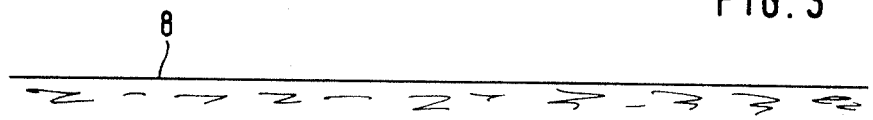
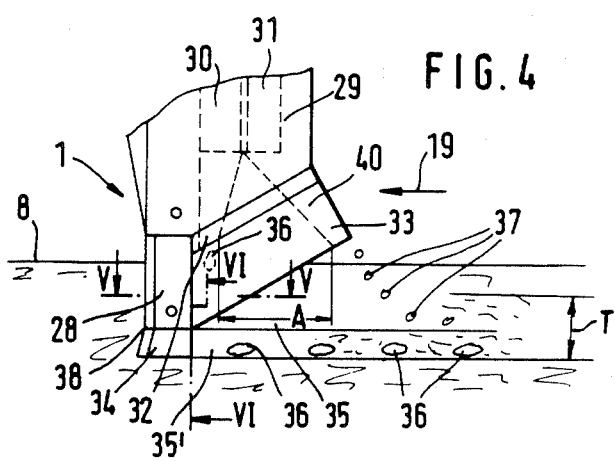
FIG. 4
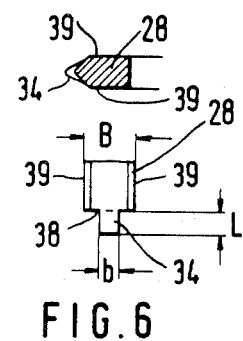
FIG. 5
FIG. 6
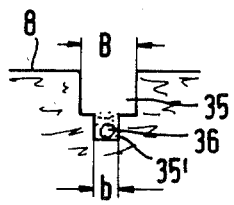
FIG. 7
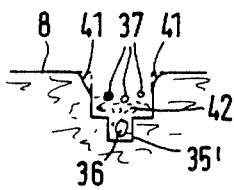
FIG. 8
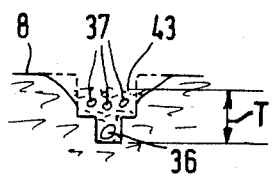
FIG. 9

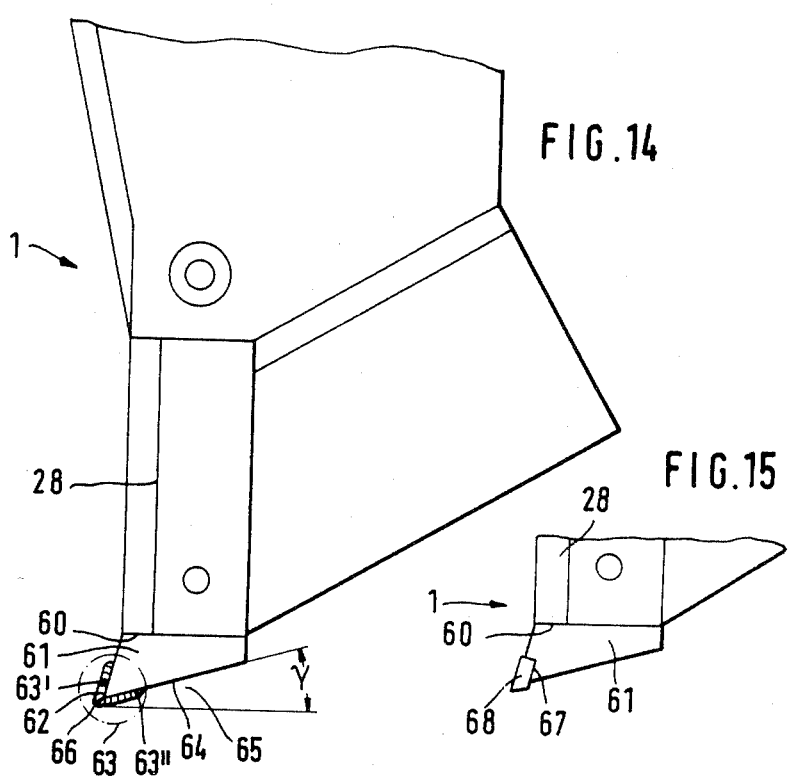

DRILL FOR APPLYING SEED AND FERTILIZER

BACKGROUND OF THE INVENTION

The invention concerns a drill for applying seed and fertilizer having a frame, reservoirs, sowing shares with at least two separate inlets for seed and fertilizer and a depth adjustment or pressure roller mounted behind each share and wherein the materials to be applied are conveyed in controller amounts to the shares for application into the soil and the shares are connected to the frame with parallelogrammatic mounts and the depth to which they penetrate into the soil can be adjusted by means of an setting device.

A drill of this type is known from German OS No. 2 552 810. The advantage of this drill is that it has depth-adjustment or pressure rollers mounted behind the sowing shares that make it possible to precisely adjust the depth of each share so that each share can apply the materials at a uniform depth even over the most uneven ground. The seed and fertilizer are always applied at a previously determined depth.

This drill has a drawback, however, in that the seed and fertilizer must always be applied together. It is tremendously important, especially in the zero-tillage method, to be able to apply seed and fertilizer separately. When they are applied together, the two materials come into contact and the fertilizer can, especially if it has a high percentage of nitrogen, at least to some extent corrode the seed. The result is significant overrun damage and decreased yield.

Another drawback to this drill is the shape of the sowing share, which generates very large lateral soil displacement. This is especially disadvantageous in zero tillage, which depends on displacing as little soil as possible. The known share also breaks up the soil to a large extent, resulting in the loss of a lot of the moisture in the soil, so that the germinating and growth conditions awaiting the seed are very poor. The shapes of these shares are also not very appropriate for use on rocky soils because the rocks damage and dull them very rapidly.

SUMMARY OF THE INVENTION

The present invention is intended as a drill for applying seed and fertilizer that can be used for zero tillage even on rocky soil and to apply seed and fertilizer separately.

The invention attains this objective wherein each sowing share is a chisel share on which a chisel is mounted on the side facing the direction of travel, wherein each chisel share has separate guides for seed and fertilizer inside its body wherein the outlets for these guides are separated in the direction of travel by a distance A, wherein the first outlet is positioned as close as possible behind the chisel point, and wherein the chisel point extends deeper into the soil than the two outlets. This results in a sowing share of very simple design. The seed and fertilizer are also always conveyed separately into the soil from their individual reservoirs. Furthermore, the first material is applied directly on the bottom of the furrow through the front outlet and covered with soil and the second material is then applied to this soil through the rear outlet. The resulting layer of earth between the two materials, the seed and the fertilizer, prevents nitrogenous fertilizer from damaging the seed.

In a preferred embodiment the forward outlet is directly aimed immediately behind the chisel and the rear outlet is aimed further to the rear to ensure impeccable separation of the two materials because gravity will ensure that enough soil will fall on top of the first material to be applied before the second material is applied.

Another improvement is attained by means of a narrow downwardly directed chisel point at least on the lower forward side of the chisel and the outsides of the chisel point extend at least approximately parallel to the direction of travel. This leads to a significantly better separation in the application of the materials because the first material to be applied falls into a furrow that is narrow enough to require very little soil to cover it up, that is, to keep the materials separate.

In a further embodiment the chisel can be interchanged on the share body to provide an especially maintenance-friendly sowing share.

In a still further preferred embodiment the upper strut of the parallelogram mounts projects over the articulation that is toward the front in the direction of travel, the part of the strut that projects over this articulation is a stop which works in conjunction with a bar that is rigidly attached to the frame, and the common operation of the stop and the bar can be activated with the setting device. This results in a very simple means of securing the individual sowing shares for transport and is known from German Pat. No. 2 640 749 to very reliably protect the individual chisel shares from rocks.

Another improvement is achieved in accordance with the invention, along with a reliable and improved application of the first material in the lower region of the furrow, in that the angle of transition from the chisel to the chisel point on both sides of the chisel share, which at least approximately parallel the direction of travel, is always less than 90° from the horizontal or from the vertical. This measure results in a furrow with a funnel-shaped cross-section, with all of the first material to be applied being forced into the narrower lower region of the furrow. This makes it possible to reliably apply different materials like seed and fertilizer separately.

In one preferred embodiment of the invention, an angle of transition that deviates from 90° can always be attained with a welded seam. Since the welded seam can be produced with a high-strength material, this part of the chisel share, which is exposed to especially high stress, can be subjected to only slight levels of wear. The welded seam can also join the narrow chisel point to the chisel in such a way that the point can very easily be renewed when worn.

The invention also improves the separate application of the two materials, especially when the operating conditions are poor and the sowing-share outlets can get obstructed with soil or pieces of plants, in that upper edge of the peaked component is at a certain distance below the ends of the guide pipes.

This measure makes it possible for the material to flow out of the other outlet and get applied in the furrow when one outlet is obstructed. In this case, of course, both materials will be applied together, but this is by far the lesser of two evils when compared to the risk of corroding the seed when one of the outlets is obstructed.

Another improvement is obtained in that the point of the chisel is provided with armor and the armor is applied only to the front region of the chisel point.

This measure simply and inexpensively increases the life of the chisel point and hence that of the chisel considerably. It also keeps the chisel and its point very tough, which is very important because it keeps them from breaking when they strike rocks or other hard objects. The recognition that only the front region of the chisel point must be armored results from the fact that as long as this armored chisel point "stands up," that is, resists the chisel share will generate a clean furrow. The front-armored region of the chisel point also always ensures, in combination with the lower region of the chisel point, which slopes up toward the rear, enough free sector to prevent the furrow from getting clogged. Since the lower, unarmored, region of the chisel point is weaker than the armored region, the bottom of the chisel will always be exposed to a slight level of wear, which is in fact desirable so that this region can always automatically free itself of adhering clods of soil. The armored chisel point, which is tipped slightly forward and always precedes the chisel in the direction of travel, will also always break up the soil so that the other parts of the chisel share will only have to throw these broken up pieces of soil to the side in the vicinity of the furrow. Since the greatest resistance and hence the highest risk of wear occurs at the chisel point, the rest of the chisel share can be weaker than the point because they will encounter only a lower level of wear.

Other features of the invention can be derived from the remaining subsidiary claims, from the specification of examples, and from the drawings, in which

BRIEF DESCRIPTION OF THE DRAWINGS

FIG. 3 is a side view of the chisel share, in accordance with the invention, in the lifted or transport position;

FIG. 4 is a larger-scale side view of the chisel share, in accordance with the invention, in the process of distributing seed and fertilizer separately in accordance with the invention;

FIG. 5 is a section through the chisel share along the line V—V in FIG. 4;

FIG. 6 is a section through the chisel share along the line VI—VI in FIG. 4;

FIG. 7 illustrates the application of the first material into the furrow;

FIG. 8 illustrates the application of the second material into the furrow;

FIG. 9 illustrates the separate application of seed and fertilizer in accordance with the invention;

FIG. 14 is a large-scale side view of a chisel point in accordance with the invention; and FIG. 15 is a large-scale side view of another chisel point in accordance with the invention.

DETAILED DESCRIPTION OF THE PREFERRED EMBODIMENTS

Figure 1:
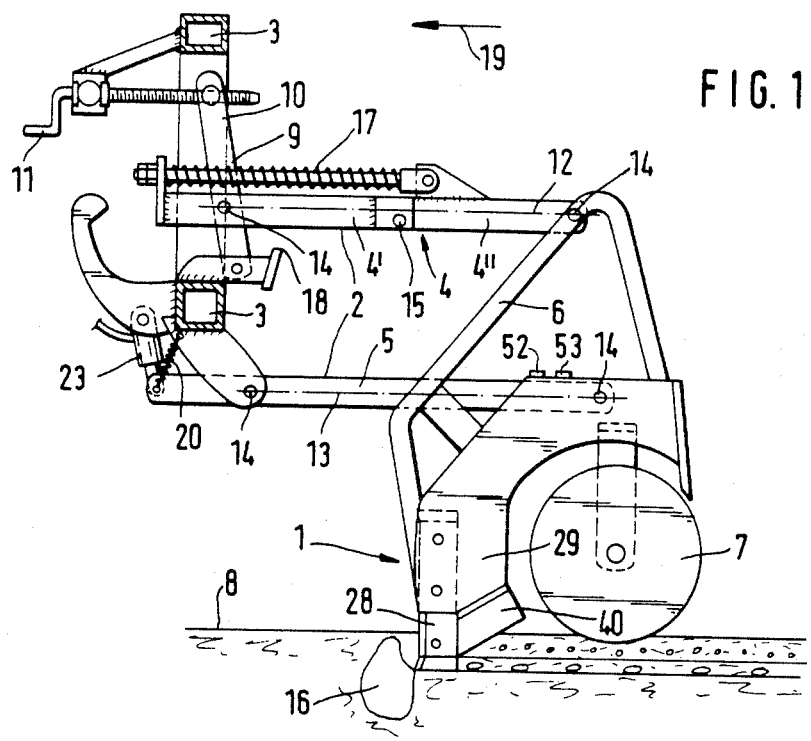
FIG. 1 is a side view of a chisel share in accordance with the invention.
Figure 2:
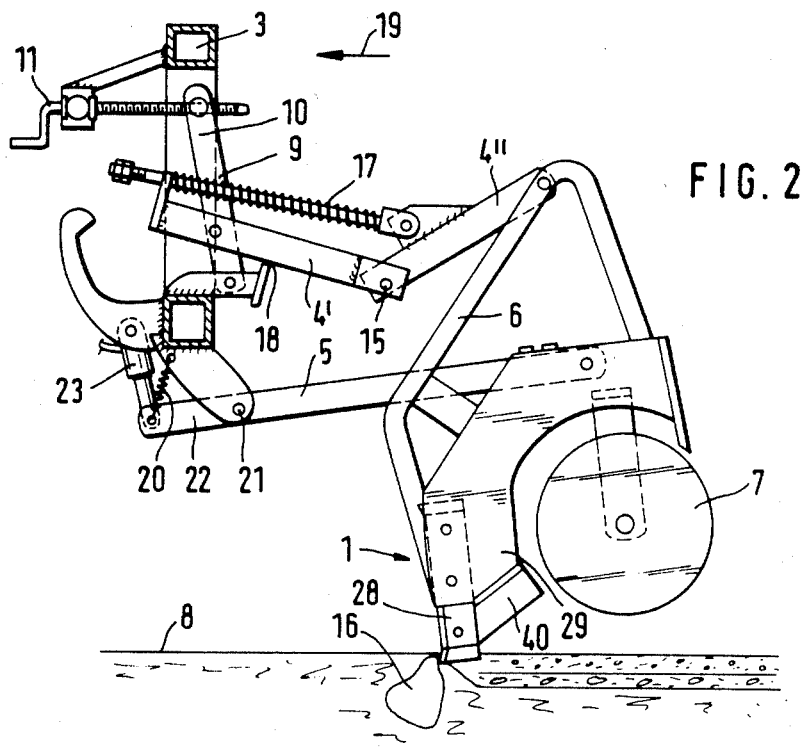
FIG. 2 is a side view of the chisel share, in accordance with the invention, overcoming an obstacle.

Referring now to FIGS. 1-3, sowing shares in the form of chisel shares 1 are mounted by means of parallelogrammatic mounts 2 on the frame 3 of a drill in such a way as to be capable of moving in an upright plane. Each parallelogrammatic mount 2 has an upper strut 4 and a lower strut 5, the front ends of which are jointed to frame 3 and the rear ends of which carry the supports 6 for a chisel share 1. A depth-adjustment or pressure roller 7 is mounted behind chisel share 1. Roller 7 determines the depth to which chisel share 1 penetrates into soil 8. Parallelogrammatic mount 2 is also connected to a central setting device 9 that is used to adjust the depth of penetration of chisel share 1. For this purpose, upper strut 4 is mounted on a pivoting lever 10 that can be pivoted with a crank 11. Pivoting lever 10 pivots upper strut 4 and with it share support 6. This changes the position of roller 7 in relation to chisel share 1, varying the depth to which it penetrates over a wide range.

The straight connecting lines 12 and 13 between the axes 14 of rotation of upper and lower struts 4 and 5 are parallel. Dividing upper strut 4 into the two strut sections 4' and 4", which are linked by an articulation 15 outside straight connecting line 12, makes it possible to swing chisel share 1 out of the way toward the rear and up when it strikes an obstruction 16, as shown in FIG. 2. A resilient element in the form of a compression spring 17 is mounted between the two strut sections 4' and 4" in such a way that it can be adjusted. This compression spring 17, which is mounted above strut sections 4' and 4", holds upper strut 4 in its normal operating position. When chisel share 1 strikes an obstruction 16, it pivots first toward the rear, with strut sections 4' and 4" being forced down in opposition to the action of compression spring 17. Once strut section 4' has pivoted over a short distance, it encounters a stop 18 that limits its motion. Once forward strut section 4' has encountered stop 18, the forward motion of the drill in the direction 19 of travel will generate a levering action on chisel share 1 that will lift it over obstruction 16. Once chisel share 1 has overcome obstruction 16, it will be forced immediately back into the soil.

Although in normal zero tillage the inherent weight of chisel share 1 is enough to force it into soil 8, it has turned out to be practical, especially when the soil is rocky, to mount a tension spring 20 on lower strut 5 to exercise additional force on the share in the direction of the soil.

A lift cylinder 23 is mounted on a piece 22 that projects over forward articulation 21 on lower strut 5. Lift cylinder 23 lifts chisel shares 1 out of soil 8 into the transport position illustrated in FIG. 3.

Upper strut 4 also projects over articulation 24 in the direction 19 of travel. The projecting part 25 is designed in the form of a stop 26 and works in conjunction with a bar 27 mounted on frame 3 as a transport-security device that maintains chisel shares 1 in the lifted position while the drill is being transported. For this purpose the individual chisel shares 1 are first lifted above lift cylinder 23. The individual upper struts 4 are then pivoted forward with central setting device 9 so that the projecting part 25 that is designed as a stop 26 on upper strut 4 will slide under bar 27, assuming the position 26' indicated with the dot-and-dash lines. Should the pressure in lift cylinder 23 drop while the drill is being transported, stop 26 will come to rest agains bar 27 and prevent chisel shares 1 from dropping.

A chisel 28 is mounted on the side of chisel share 1 that faces direction 19 of travel. As is shown in more detail in FIGS. 4-6, two separate guides 30 and 31 for seed and fertilizer are mounted inside share body 29. Outlets 32 and 33 are separated by a distance A along direction 19 of travel. Since chisel point 34 extends deeper into soil 8 than outlets 32 and 33, the seed and fertilizer can be applied effectively into the furrow 35 produced by chisel share 1. Since forward outlet 32, which is intended for the seed 36, is directly aimed immediately behind chisel 28, and rear outlet 33, which is intended for the fertilizer 37, is aimed farther to the rear, seed and fertilizer will be applied separately.

There is a narrow downwardly directed chisel point 34 on the lower forward side 38 of chisel 28. The outsides 39 of chisel point 34 extend at least approximately parallel in the direction 19 of travel to provide a satisfactory furrow 35 in which to apply seed 36. The width b of chisel point 34 is about half the width B of chisel 28. The length L of chisel point 34 is about equal to the width B of chisel 28 and should also be about equal to the depth T to which seed 36 is applied.

Chisels 28 can be interchanged on share body 29 so that they can be replaced when worn out. Chisels 28 that are appropriate for different types of seed can also be mounted in the share body. The side of chisel 28 that faces direction 19 of travel is upright so that as little soil as possible will be displaced in producing a furrow 35.

The way in which seed and fertilizer are applied separately will now be specified with reference to FIGS. 7-9.

Chisel share 1 produces the furrow 35 illustrated in cross-section in FIG. 7 in soil 8. The width B of the upper region of furrow 35 is double the width b of the lower region. The narrow width b is produced by chisel point 34. Seed 36 falling out of forward outlet 32 is applied to the bottom of this narrow lower furrow 35'. As chisel share 1 moves forward through soil 8 and soil is forced out of furrow 35, the soil to the side of furrow 35 will also be slightly loosened. Guide plates 40 on the rear of chisel 28 follow and control the collapse of the walls 41 of furrow 35 to prevent it from falling together so that the seed can be applied to its bottom.

Once seed 36 has been applied into the narrow furrow 35' through forward outlet 32 as illustrated in FIG. 4, the side walls 41 of the furrow will collapse as the result of the forward motion of chisel share 1 and of gravity to the extent allowed by guide plates 40 and the lateral components and will cover seed 36 with a thin layer 42 of soil as illustrated in FIG. 8. Fertilizer 37 will be deposited on top of layer 42 through outlet 33, which is aimed farther to the rear, as illustrated in FIG. 8. This will result in a separate application of seed and fertilizer, which will not come into contact with each other. Once fertilizer 37 has been applied, the walls 41 of the furrow will collapse further and cover fertilizer 37 at least partly with another layer 43 of soil. The depth-adustment or pressure roller 7 now follows and further compresses the furrow walls 41 so that all of fertilizer 37 will be covered with soil as illustrated in FIG. 9.

In many zero-tillage applications it is practical to apply fertilizer 37 into narrow furrow 35' through forward outlet 32 and seed 36 on top of the thin layer 42 of soil through rear outlet 33.

Figure 10:
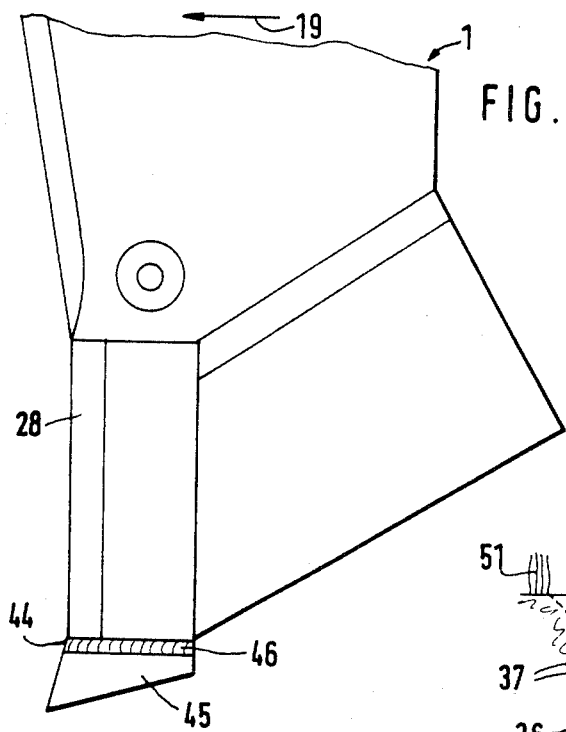
FIG. 10 is a large-scale side view in detail of another chisel share with a chisel and chisel point in accordance with the invention.
Figure 11:
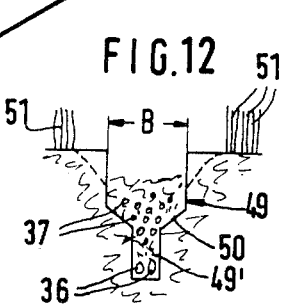
FIG. 11 is a front view of the chisel share, chisel, and chisel point in FIG. 10.

In the embodiment illustrated in FIG. 10, chisel 28 is mounted on the side of chisel share 1 that faces the direction 19 of travel. The downward-facing chisel point 45 is welded with two welded seams 46 to the bottom 44 of chisel 28. Welded seams 46 produce a transition that deviates by 90° from chisel 28 to chisel point 45. This transition from chisel 28 to chisel point 45 on the two sides of chisel share 1 that at least approximately parallel direction 19 of travel occurs at an angle α of approximately 45° to the horizontal 47 or vertical 48, as is shown in FIG. 11.

Figure 12:
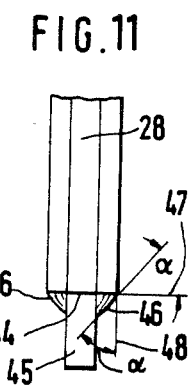
FIG. 12 is a section through a furrow produced by the chisel share in FIG. 10 with the seed and fertilizer applied into it.

The resulting shape of chisel share 1 in the region of transition between chisel 28 and chisel point 45 will produce the furrow 49 with a funnel-shaped cross-section illustrated in FIG. 12. This funnel-shaped furrow 49 makes it possible to get by with a furrow width B' that is as narrow as possible while separately applying seed 36 to the lower narrow region 49' of the furrow and fertilizer 37 above it and separated by a layer of soil. Seed 36 is guided from above by chisel share 1 into furrow 49 from which it will necessarily drop into the narrow lower region 49'. The seeds 36 that encounter the sloping sides 50 of furrow 49 will slide along the slope into narrow lower region 49'.

Some of the soil will subsequently fall on top of seed 36, covering it and forming a layer that will separate the fertilizer 37 that is subsequently guided into furrow 49. Once fertilizer 37 has been applied into furrow 49, more soil will drop into the furrow and cover it as well. The depth-adustment or pressure roller 7 behind chisel share 1 will pack down the materials deposited in the furrow, slightly compressing its upper walls.

The funnel shape of furrow 49 is a particular advantage in zero tillage. The type of furrow or chisel share illustrated in FIG. 10 makes it possible for the first time to satisfy all the essential demands of zero tillage with a very narrow furrow or chisel share that will cause very little damage to the surface of the soil. One consequence is that only a minimum amount of soil needs to be displaced or tilled when introducing the seed and fertilizer into the soil to obtain as much of the stubble 51 that is left behind on the ground during harvesting as possible. Stubble 51 prevents the soil from drying out.

Figure 13:
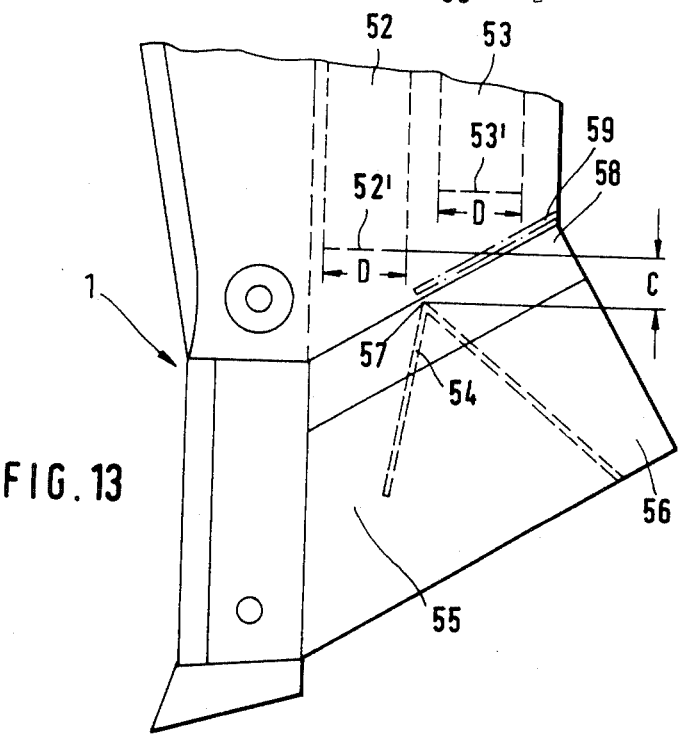
FIG. 13 is a large-scale side view in detail of another sowing share in accordance with the invention.

In the embodiment illustrated in FIG. 13, chisel share 1 has separate inlets for guide pipes 52 and 53, forward guide pipe 52 being used for seed and rear guide pipe 53 being used for fertilizer. There is a peaked component 54 underneath the ends 52' and 53' of the guide pipes that guides the material pouring out of the ends to the outlets 55 and 56 associated with each. The upper edge 57 of peaked component 54 is positioned at a distance G below guide-pipe ends 52' and 53' that at least approximates the diameter D of guide pipes 52 and 53. This means that, when one of the two outlets 55 and 56 gets clogged up, the particular material can flow out of the sowing share through the other outlet. The material will fill up the region above the clogged outlet and then flow over the upper edge 57 of peaked component 54 into the other outlet.

The end 52' of forward guide pipe 52 extends deeper than the end 53' of guide pipe 53 into the body 58 of chisel share 1. This makes it possible to employ the share when seed and fertilizer without nitrogen are to be applied into a furrow together. It is necessary only to insert a plate 59, indicated with dot-and-dash lines, above the upper edge 57 of peaked component 54 into share body 58. In this case the fertilizer will be forced into forward outlet 55 because rear outlet 56 is covered.

The overall specification of the above embodiment also holds for a chisel share in which outlets 55 and 56 are positioned one behind the other along the direction of travel.

In the embodiment illustrated in FIG. 14, the side of chisel share 1 that faces the direction 19 of travel has a chisel 28, the bottom 60 of which is connected to a narrow downward-facing chisel point 61. Chisel point 61 is about half as wide as chisel 28 and precedes it in the direction 19 of travel. Chisel point 61 is provided, but only in its forward area 63, as indicated by the dot-and-dash circle, with armor 62. Armor 62 is applied only to the lower front region 63' with respect to the direction 19 of travel and to the underside 64 of chisel point 61 along the forward region 63'' with respect to the direction 19 of travel.

The armor 62 over this small forward area 63 of chisel point 61 enormously prolongs its life and hence that of chisel share 1. The maintenance of a free sector 65 with an angle γ also prevents the base of the furrow from getting clogged.

The armor 62 illustrated in FIG. 14 is applied with welding electrodes. It is of decisive significance for the welding to proceed from the forward point 66 of chisel point 61 because this will make the material especially hard and wear-resistant in that area on account of the initially cold electrodes and chisel point.

The armor on the chisel point 61 in FIG. 15 consists of a hard-metal plate 68 soldered into a recess 67 in chisel point 61. It would also be conceivable to screw the plate on.

It will be appreciated that the instant specification and claims are set forth by way of illustration and not limitation, and that various modifications and changes may be made without departing from the spirit and scope of the present invention.

What is claimed is:

1. In a drill for direct seeding which is movable in a given direction of travel for applying seed and fertilizer into soil, the drill having a frame, sowing shares with at least two separate inlets and outlets for seed and fertilizer and a pressure roller mounted behind each share, means for conveying the seed and fertilizer in controlled amounts through separate conduits inside the shares for application into the soil, wherein the outlets are at an interval from each other along the direction of travel, wherein the shares are connected to the frame with parallelogram mounts to mount each share and allow vertical adjustment of the depth to which the share penetrates into the soil, each sowing share has chisel at the front thereof in the direction of travel; roller means limiting the depth ofthe shares the improvement wherein: each sowing share has continuous substantially parallel plates extending rearwardly of the sides of the chisel in the direction of travel to the rearmost outlet and said parallelogram mounts maintaining the front of each chisel with respect to the direction of travel substantially vertical straight down direction, the sides of the lowest part of the chisel penetrating into the soil are no wider than the sides at the top of the chisel and the chisel has at least approximately the same width as the width between the sides of the share plates and wherein the forwardmost outlet is defined by the rear face of the chisel and direclty aimed immediately behind the chisel and the rearmost outlet terminates rearwardly of the forwardmost outlet defined at the rear of the plates and substantially above the lowest part of the chisel and thereby the bottom ofthe furrow formed by the chisel; the bottom edges of the parallel plates sloping upwardly, rearwardly from the forwardmost outlet to the rearmost outlet, whereby a layer of soil can be formed between the outlets as each share is advanced.

2. The drill according to claim 1, wherein the chisel has a chisel point at the lowest part which is narrower than the top of the chisel at least one the lower forward side of the chisel and the outer sides of the chisel point extend at least approximately parallel to the direction of travel.

3. The drill according to claim 2, wherein the width of the chisel point is substantially half the width of the chisel.

4. The drill according to claim 2 or 3, wherein the length of the chisel point is substantially equal to the width of the chisel.

5. The drill according to claim 2 or 3, wherein the length of the chisel point is substantially equal to the depth to which the seed is to be applied in the soil.

6. The drill according to claim 1, wherein the side of the chisel that faces the direction of travel is upright.

7. The drill according to claim 1 or claim 2, wherein the angle α of transmission from the chisel to chisel point on both sides thereof which at least approximately parallel the direction of travel, is always less than 90° from the horizontal and from the vertical.

8. The drill according to claim 7, wherein the angle α ranges approximately from 30° to 60°.

9. The drill according to claim 8, wherein the angle α is 45°.

10. The drill according to claim 7, wherein the transition at an angle α that deviates from 90° comprises a welded seam.

11. The drill according to claim 10, wherein the narrow chisel point is joined to the chisel with the welded seam.

12. The drill according to claim 1, wherein the chisel has a chisel point provided with armor only in a forward area including an upright region facing the direction of travel and a portion of the underside of the chisel point only along a forward portion facing the direction of travel.

* * * * *